Sept. 29, 1970      C. W. PLOUCH      3,531,634
FIGURINE MOUNT
Filed Oct. 25, 1967
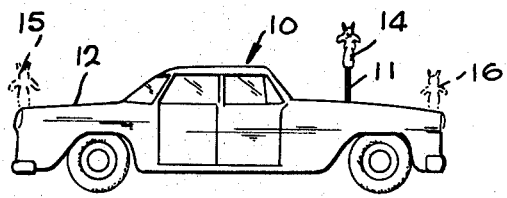
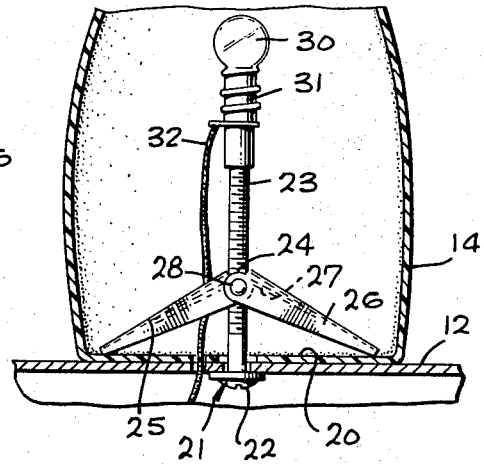
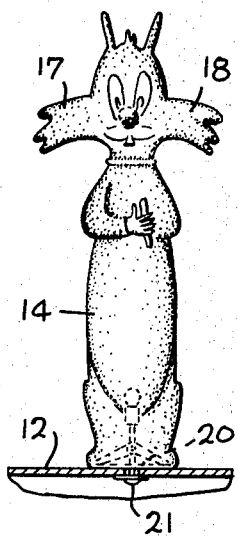
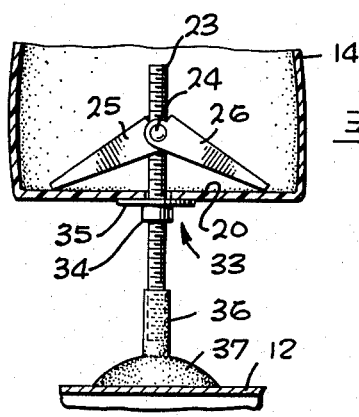
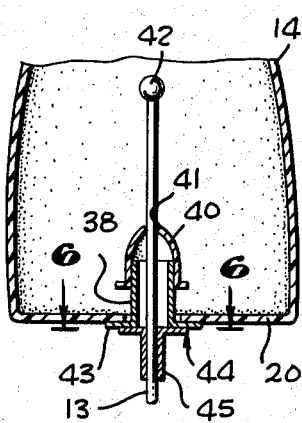
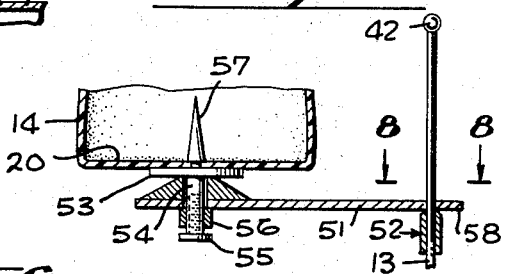
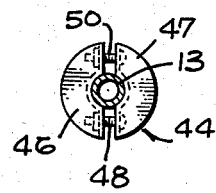
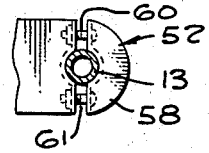
INVENTOR.
CECIL W. PLOUCH
BY Roger G. Marrs

United States Patent Office 3,531,634
Patented Sept. 29, 1970

3,531,634
FIGURINE MOUNT
Cecil W. Plouch, 1031–A Cumberland Road,
Glendale, Calif. 91202
Filed Oct. 25, 1967, Ser. No. 678,021
Int. Cl. B60q 1/00
U.S. Cl. 240—7.1                      6 Claims

ABSTRACT OF THE DISCLOSURE

A figurine mount fixedly or rotatably supports a figurine which has a base section constructed to receive either a blind fastener or a bearing assembly for coupling the figurine to a stationary base. An illumination device may be provided for selectively lighting the figurine.

BACKGROUND OF THE INVENTION

Field of the invention

This invention relates to mounting constructions and, more particularly, to a novel figurine mount adapted to be fixed on a supporting base or to be rotatably mounted thereon so as to permit rotation thereof in response to impingement of onrushing air past the figurine.

Description of the prior art

In the past, it has been the conventional practice to decorate vehicles such as automobiles with a variety of statutes and figurines. Some of the figurines assume a shape and configuration of animals, novelty shapes, and religious objects. Usually, the figurines are mounted in the interior of the vehicle, such as on the dashboard, for example, by means of a magnetic coupling carried in the base of the figurine, which is attracted to the metal of the dashboard, wherein such magnetic attraction serves to support the figurine in position thereon. Another supporting arrangement which has been used in the past resides in the use of a cord or leather thong which is formed in a loop passing through the figurine so that the figurine may be swingably supported from such vehicle accessories as the rear view mirror or sun visor.

Although such conventional mounting constructions have been moderately successful in mounting novelty ornaments and other figurines on the interior of a vehicle, it is to be noted that a swinging ornament is readily distracting to the driver of the vehicle and magnetically coupled ornaments are easily upset and dislodged from their mounting locations in response to rapid movement or unusual load forces encountered as the vehicle is maneuvered about the roadway. Furthermore, it is sometimes desirable that the decorative ornament in the form of a figurine be located on the exterior of the vehicle so that the ornament will be readily visible to other drivers and pedestrians.

Since one of the primary purposes of employing such an ornament is to attract attention, the figurine should have the capability of movement, as well as illumination, so that maximum visual attraction appeal is attained. Inasmuch as the exterior contour of a conventional vehicle is relatively streamlined, few protrusions or supporting brackets are available on which such a figurine can be supported externally thereon. Therefore, the mounting construction for the figurine must take into account the overall design of the vehicle body on which it is mounted and the availability of any auxiliary mounting supports.

SUMMARY OF THE INVENTION

Accordingly, the difficulties and problems encountered with conventional mounting constructions for supporting an ornament on a vehicle are obviated by the present invention, in which the ornamental figurine is of irregular contour and includes a base section through which the shank of a bolt passes so that the base section resides in intimate contact with the surface of a base support, such as the trunk lid of an automobile. The head of the bolt is located on the underside of the trunk lid, while the base section of the figurine resides on the exterior surface, so that when an expandable member such as a spread wing nut is threadably connected on the shank of the bolt and the bolt rotated, the legs of the nut will spread as the terminating ends of each leg engage with the inside surface of the base section. As the bolt is rotated, the spread wing nut will expand until binding occurs between its threaded connection with the shank and the terminating ends of each leg encountering the upright walls of the figurine. In this manner, the figurine is fixedly mounted to the exterior surface of the vehicle.

Another embodiment of the invention provides for employing a bearing assembly carried on the shank of the bolt wherein the figurine base section is directly mounted on the assembly for rotation thereof.

The irregular contour of the figurine effects rotation of the device due to the impingement of onrushing air against the irregularities of the figurine so that it freely turns. Such action enhances the attention-gathering appeal of the device.

Another version permits the figurine to be mounted directly on an upstanding support, external of the vehicle, such as on the radio antenna. The figurine can be mounted on an arm which is cantilevered outwardly from the antenna, or a novel mounting construction is provided on the base section of the figurine adapted to receive the terminating end of the antenna so that the terminating end is enclosed by the hollow figurine.

Therefore, it is a primary object of the present invention to provide a novel mounting construction for a figurine which is adapted to be mounted on the exterior of a vehicle.

Another object of the present invention is to provide a novel mounting construction whereby the figurine may be rotatably supported on the radio antenna thereof, so that the figurine is in a freely rotatable position.

Another object of the present invention is to provide a novel mounting construction for a hollow figurine, having internal illumination means employed in combination with a fixed mounting structure for securing the figurine to the body of a vehicle.

Yet another object of the present invention is to provide a novel attention-attracting figurine adapted to be fixedly secured to a base, which may be supported on the rear-deck shelf of the vehicle interior, on the dashboard thereof, or which may further be employed as a night light on an article of cabinet furniture.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a side elevational view of a typical vehicle illustrating alternate locations thereon of suitable figurines supported on the novel mount constructions of the present invention;

FIG. 2 is an enlarged front elevational view of a suitable figurine having an irregular configuration incorporating an internal lighting means and supported on a fixed mount of the present invention;

FIG. 3 is an enlarged sectional view of the fixed mount 3,531,634 and lighting means as taken in the direction of arrows 3—3 of FIG. 2;

FIG. 4 is a sectional view of another embodiment of the present invention illustrating a rotatable mount for the figurine;

FIG. 5 is a sectional view of another embodiment of the present invention illustrating a rotatable mount for the figurine;

FIG. 6 is a cross-sectional view of the mount employed in the construction of FIG. 5 as taken in the direction of arrows 6—6 thereof;

FIG. 7 is a cross-sectional view of still another embodiment of the present invention illustrating a rotatable mount carried on a cantilevered arm extending from a vertical support; and FIG. 8 is a cross-sectional view of the amount employed in the embodiment of FIG. 7 as taken in the direction of arrows 8—8 thereof.

DESCRIPTION OF THE PREFERRED EMBODIMENTS

Referring to FIG. 1, a conventional automobile is illustrated in the general direction of arrow 10, which includes a hood portion 11 and a rear trunk portion 12, as well as an antenna 13. It is to be noted that the radio antenna is extended in a vertical, upstanding relationship with respect to the hood 11. However, the antenna may be located on any suitable portion of the vehicle body, such as adjacent the side of the front windshield or on the trunk lid 12. A suitable figurine of irregular contour is illustrated by numeral 14 as being supported on the end of the radio antenna 13. However, it is within the concept of the present invention to mount the figurine elsewhere, such as is shown in broken lines by numerals 15 and 16, located on the rear and front body portions of the vehicle, respectively. Furthermore, it is to be understood that in some configurations, the mounting construction of the present invention may serve to mount the figurine on the dashboard or the rear-deck shelf on the interior of the vehicle body.

Referring now to FIG. 2, it can be seen that the hollow figurine 14 includes a plurality of external irregularities, such as is represented by outwardly extending projections 17 and 18. The figurine includes a base section 20, which is seated on the external surface of the trunk lid 12, and is maintained in fixed securement therewith by means of a blind fastener 21.

As shown in FIG. 3, the blind fastener 21 includes an enlarged slotted head 22 integrally formed on one end of a shank 23 which is substantially threaded throughout its length in rotating relationship with a nut 24. The opposite sides of nut 24 are provided with expandable legs 25 and 26, which are pivotally secured on the opposite sides of nut 24 and which move rectilinearly along the length of shank 23 as the bolt 22 is rotated in cooperation with nut 24. The terminating ends of legs 25 and 26 slidably engage with the inside surface of the figurine base section 20 and are adapted to ride thereon as the nut 24 moves along the length of the shank 23. To maintain the legs extended, a spring means 27 is provided having a coiled midsection attached to the nut 24 via pivot screws 28 located on the opposite side of the nut 24. Therefore, it can be seen that as the shank 23 is rotated, nut 24 will move along the length thereof and as the nut moves toward the base section 20, the legs 25 and 26 will expand. The expansion of the legs 25 and 26 will cease when the terminating ends of the legs engage with the corners of the base section 20 with the upstanding walls of the figurine 14. At this time, a binding action will be produced that will effect a fixed securement of the figurine 14 to the trunk lid 12.

It is also to be noted in FIGS. 2 and 3 that the free end of shank 23 serves to mount an illumination means represented by light 30 carried in a suitable electrical socket 31. An electrical wire 32 is connected at one end to the socket 31 and on its other end to a source of electrical energy such as a battery. By this means, the interior of the figurine 14 may be illuminated and by employing a transparent or translucent composition, the illumination will be visible external of the figurine to attract the desired attention.

Referring now to FIG. 4, another embodiment of the present invention is shown which employs the threaded shank 23 and the expandable leg nut member 24 as described in connection with the embodiment of FIG. 3. However, the head 22 has been replaced by a bearing assembly 33 on which the base section 20 of the figurine is suitably seated and the nut portion of the member 24 loosely rotates about a smooth portion of the shank. By this mechanism, the figurine is permitted to rotate as the onrushing air impinges against the upstanding projections 17 and 18. The bearing assembly includes a collar 34 on which a revolving disc 35 is rotatably disposed. The opposite end of the shank 23 from its end projected into the hollow of the figurine 14 is fixedly engaged in the bore of an elongated socket 36 integrally formed with a suction cup 37. The cup 37 is removably secured to a portion of the vehicle body, such as the trunk lid 12. Preferably, the suction cup 37, as well as the extension socket 36, is composed of a flexible and resilient material so that the figurine 14 will be permitted to pivot in a limited manner about the suction cup 37.

Referring now to FIG. 5, another embodiment of the present invention is shown employing a mounting construction for supporting the figurine 14 on an upstanding support, such as the extended radio antenna 13. The base section 20 is provided with a central opening through which a sleeve member 38 projects into the interior of the figurine. The sleeve 38 is tubular in configuration and includes a flexible member 40 carried on its free end, having an opening coaxial with the opening in base section 20 for receiving the terminating end of antenna 13. The aperture, as indicated by numeral 41, is of sufficient size to permit a tip 42 of the antenna to be forcibly passed therethrough. Inasmuch as antennas employ a tapered cross-section extending from the tip 42 downwardly, the sides of the antenna will engage with the wall of member 40 defining aperture 41 to retain and support the figurine 14 thereon.

The opposite end of the sleeve 38 terminates in an outwardly extending annular flange 43 which is provided with a bearing surface resting against an annular flange 44 carried on a mounting element 45. The mounting element 45 is tubular in cross-section and is carried about the surface of the antenna 13 so that in combination with the member 40, the figurine is adequately supported and any loads generated in the figurine are transmitted into the body of the vehicle via the antenna through member 40 and element 45. Inasmuch as the flanges 43 and 44 are in abutment, the figurine 14 will be permitted to rotate freely as the onrushing air impinges against the irregularities of the figurine contours.

FIG. 6 illustrates that flange 44 may be segmented into sections 46 and 47 and are joined together on opposite sides by means of fasteners 48 and 50. By this means, the sleeve 45 need not be passed over the tip 42, but may be secured to the antenna 13 by the clamping action of the fasteners 48 and 50.

Referring now to FIG. 7, it is to be noted that the figurine 14 is supported alongside of antenna 13 by means of an arm 51 that is cantilevered outwardly from the end of the antenna by means of clamping arrangement 52. The figurine 14 is supported on a bearing 53 that is carried on an elongated sleeve 54 supported on a retainer 56. The shank of the fastener is in threaded engagement with a retainer 56 that is carried on the arm 51, so that the bearing and, hence, the figurine 14, is rotatably supported thereby. Coaxial with the bearing 53 is a spike 57 that may be employed for puncturing the base section 20 of the figurine in the event the figurine is not provided with an access aperture.

FIG. 8 shows the clamping means 52 in the form of a clamp portion 58 adapted to engage one side of the antenna 13 while the opposite side of the antenna is engaged by the end of member 51. By means of threadable fasteners 60 and 61, the clamp portion 58 may be secured to arm 51 about the antenna 13 so that the figurine and arm 51 is fixedly supported thereon.

From the foregoing, it can be seen that the inventive concept of the present invention provides a novel mounting construction for either fixedly or rotatably mounting an ornamental figurine from an upstanding projection such as a radio antenna or directly onto the body portion of a vehicle. It is to be understood, however, that the mounting construction may be employed for securing a figurine onto a base so that the construction can be employed as a night light in a room for infants or as a flashing indicator when mounted on the interior of the vehicle body. The device has eye-catching appeal and an added attraction is produced by the illumination means or by the rapid rotation of the figurine or by the swaying or flexing of the figurine by employing the embodiment shown in FIG. 4.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. In a mounting construction for securing a hollow figurine having a base section to a supporting structure, the improvement which comprises:
   means for carrying said base section on said supporting structure;
   a bearing assembly interposed between said base section and said supporting structure to permit rotation of said figurine;
   clamping means for detachably connecting said carrying means to said supporting structure;
   said carrying means comprising an elongated arm cantilevered outwardly and laterally from said supporting structure; and wherein
   said figurine is of irregular contour having outwardly extending projections adapted to be impinged against by oncoming air so as to move said figurine on said bearing assembly.

2. The invention as defined in claim 1 wherein carrying means further includes a tubular sleeve downwardly depending from the underside of said bearing assembly and projecting through the free end of said arm; and
   a retainer secured to said arm for supporting said sleeve on its end projecting through said arm.

3. The invention as defined in claim 2 including a fluted and tapered spike carried on said bearing assembly adapted to puncture said base section so that said base section engages with said bearing assembly.

4. The invention as defined in claim 1 including illumination means operably carried within the interor of said figurine and adapted to illuminate the interior thereof; and
   said figurine being composed of light-transmitting material adapted to pass the light from said illumination means exteriorly of said figurine.

5. In a mounting construction for securing a hollow figurine having a base section to a supporting structure, the improvement which comprises:
   means for carrying said base section on said supporting structure;
   a bearing assembly interposed between said base section and said supporting structure to permit rotation of said figurine;
   clamping means for detachably connecting said carrying means to said supporting structure;
   said bearing assembly including a tubular member coaxial with said supporting structure having an annular flange for carrying said base section and a second tubular member having an annular flange slidably carrying said first mentioned flange so as to allow rotational movement therebetween;
   said clamping means coupling said second member to said supporting structure; and
   a hollow resilient sleeve carried on the free end of said first mentioned member internally of said figurine having an aperture through which said supporting structure extends.

6. In a mounting construction for securing a hollow figurine having a base section onto a supporting structure, the improvement which comprises:
   fastener means having a threaded shank extending into the interior of said figurine and an expandable means movably carried on said shank adapted to forcibly engage with the inner surface of said base section to secure said base section onto said supporting structure;
   an arm releasably carried laterally of said supporting structure;
   said fastener means coupling said arm to said base section;
   clamping means detachably connecting said arm to said supporting structure;
   said supporting structure being an upstanding radio antenna carried on a vehicle; and including
   bearing means interposed between said arm and said base section for allowing relative movement therebetween.

References Cited
UNITED STATES PATENTS

| | | | |
|---|---|---|---|
| 1,810,289 | 6/1931 | McPhillips | 240—10 XR |
| 2,081,323 | 5/1937 | Cordes | 85—3 |
| 2,174,067 | 9/1939 | Bahr | 240—8.1 |
| 2,506,295 | 5/1950 | Elvan | 240—10 |
| 2,744,189 | 5/1956 | Wudyka | 240—6.4 XR |
| 2,812,423 | 11/1957 | Penna | 240—52.2 XR |
| 2,849,601 | 8/1958 | Walzer | 240—52.2 |
| 3,355,582 | 11/1967 | Swee | 240—52.5 XR |

NORTON ANSHER, Primary Examiner

D. S. STALLARD, Assistant Examiner

U.S. Cl. X.R.
240—8.1